United States Patent
Bass (10) Patent No.: US 6,308,529 B1
(45) Date of Patent: Oct. 30, 2001

(54) POULTRY CHILLER WITH OPEN AUGER

(75) Inventor: Gregory T. Bass, Clayton, NC (US)

(73) Assignee: Morris & Associates, Inc., Garner, NC (US)

( * ) Notice: Subject to any disclaimer, the term of this patent is extended or adjusted under 35 U.S.C. 154(b) by 0 days.

(21) Appl. No.: 09/421,700

(22) Filed: Oct. 20, 1999

(51) Int. Cl.⁷ .................................................. F25D 3/12
(52) U.S. Cl. ........................................ 62/381; 62/63
(58) Field of Search ........................................ 62/63, 381

(56) References Cited

U.S. PATENT DOCUMENTS

| | | | |
|---|---|---|---|
| 3,097,501 | * 7/1963 | Pappas | 62/63 |
| 3,240,026 | * 3/1966 | Van Dolah et al. | 62/63 |
| 3,250,086 | 5/1966 | Morris, Jr. | 62/375 |
| 3,395,549 | * 8/1968 | Grimes | 62/63 |
| 3,410,101 | 11/1968 | Morris, Jr. | 62/63 |
| 3,426,546 | * 2/1969 | Crane | 62/63 |
| 5,030,465 | * 7/1991 | Curry et al. | 62/63 |
| 5,456,091 | 10/1995 | Zittel | 62/375 |
| 5,509,470 | 4/1996 | Bass | 165/158 |
| 5,531,034 | 7/1996 | Mentz | 34/179 |
| 5,868,000 | 2/1999 | Morris, Jr. et al. | 62/374 |

* cited by examiner

*Primary Examiner*—Ronald Capossela
(74) *Attorney, Agent, or Firm*—Thomas, Kayden, Horstemeyer & Risley (57) ABSTRACT

Poultry is chilled by moving the birds with an auger in one direction and chilled water in the opposite direction. The auger that moves the birds has a segmented auger blade (23) formed with a series of blade segments (24) which overlap one another along the auger shaft (22) and define water passages (26) therebetween. A grill (36) is positioned in the passages. The water passages permit movement of chilled water through the tank, and the offset edges of adjacent auger blade segments, together with the water movement, causes a tumbling and reorientation of the birds as they are chilled and conveyed through the tank.

13 Claims, 5 Drawing Sheets

POULTRY CHILLER WITH OPEN AUGER

FIELD OF THE INVENTION

This invention involves poultry chillers for reducing the temperature of whole birds after the birds have been eviscerated on a poultry processing line.

BACKGROUND OF THE INVENTION

It is desirable to reduce the temperature of chickens and other type poultry after the birds have been processed, are defeathered, eviscerated and are otherwise oven-ready and before the birds are packaged for delivery to the retail customer. A conventional poultry chiller is the "auger type" chiller which includes a trough-shaped half-round tank filled with ice water in which the auger provides positive movement of the birds through the tank. The cooling effect for the water and the birds was originally provided by crushed ice added to the water. The later designs include a counter-flow recirculation of the chilled water through the tank, with the water being chilled by a refrigerated heat exchanger instead of using ice. The water is introduced at one end of the tank and flows progressively to the other end, where it is recirculated. In the meantime, the birds are continually delivered to the tank and moved under the influence of the auger in the counter-flow direction, and are lifted from the delivery end of the tank for further processing. A prior art poultry chiller of this general type is disclosed in U.S. Pat. No. 5,868,000, and a heat exchanger for the water refrigeration system suitable for this purpose is shown in U.S. Pat. No. 5,509,470.

The trough-shaped tanks of the chillers can be five to ten feet in diameter. The United States Department of Agriculture rules require one-half gallon of fresh makeup water to be added to the chiller for each bird that is processed through the chiller, which is 70 gallons per minute for a processing line that moves 140 birds per minute. The fresh makeup water is added to the tank at the delivery end of the tank, where the birds have been chilled and are being lifted out of the tank. The water flows against the birds in the opposite direction of movement of the birds and the auger of the tank, and the water overflows at the bird inlet end of the tank, assuring that the birds are always flowing into the cleanest water and that there is always a temperature drop between the temperature of each bird and the temperature of the water about each bird.

One of the problems of counter-flowing the refrigerated water through the tank is that the auger, by its rotation as it moves the birds forward, also pushes approximately the same volume of water toward the bird outlet end, along with the birds. The water must find its way back in counter-flow direction with respect to the birds and to the moving surfaces of the auger.

It is desirable that the augers of the chillers utilize solid auger flights so as to prevent the birds becoming trapped or hanging against the auger and not moving properly through the tank, and to avoid damaging the birds. Because of the desirability to employ augers with solid flights, the accepted way to move the water through the tank in a counter-flow direction with respect to both the auger and the birds is to flow the water around the outside perimeter of the auger flights, between the auger and the facing surface of the tank, which is normally limited to a small dimension, such as between 1 inch and 1½ inches clearance space. This small space at the perimeter of the auger avoids having the smaller birds becoming caught or trapped between the auger and the tank, and avoids damage to the birds.

Usually, the auger of the chiller has a 360° flight every 4 linear feet of the auger. Therefore, the water is required to flow about the peripheries of several auger flights when moving along the tank.

In addition to the critical restriction of water flow through this narrow restriction between the perimeter of the auger flights and the facing surface of the tank there is an additional restriction at the perimeter of the auger blades by the birds which tend to follow the path of the water about the blade and partially block the perimeter opening about the auger blades. This significantly limits the amount of water that can be circulated through the birds at this position in the tank, thereby resulting in inadequate cooling of the birds.

Also, since the counter-flow water movement that occurs in this arrangement flows only around the edges of the flights of the auger, and not uniformly through the mass of birds at the centerline of the tank, there is a lack of uniformity and effectiveness in chilling the birds that are at the centerline of the tank or which are "clumped" or clustered together in the tank. Typically, most of the birds will migrate toward one sidewall of the tank because of frictional contact with the rotating auger, leaving the opposite side of the tank with fewer birds, and the major circulation of water is about the edges of the auger flight that is free of birds and therefore open for water movement.

Another problem with the typical prior art auger driven poultry chiller is that when the operation of the processing line which delivers birds to the chiller is being progressively terminated between shifts of the workers in the plant, by terminating the introduction of birds to the processing line and allowing the birds already on the line to move through the line, the absence of delivery of birds to the chiller tank in combination with the removal of birds from the delivery end of the tank results in less volume of birds and water in the tank, causing a reduction in the water level of the tank. This means that the water has even less space to pass around the perimeter of the auger blade to the next segment of the tank, resulting in starving the downstream segments of the tank of water. The reduction of supply of water in the last segment of the tank may result in starving the circulating pump of water.

It is to the above noted problems of the prior art that this invention is directed.

SUMMARY OF THE INVENTION

Briefly described, the present invention comprises a chiller for previously eviscerated oven-ready whole poultry birds which utilizes a trough-shaped open top, half-round tank and a rotary auger that is partially submerged in the tank. Chilled water is delivered to the first end of the tank and moves in a counter-flow relationship with respect to the auger and birds that are moving in the tank.

The auger includes an auger shaft that extends along the length of the tank at the anticipated level of the water in the tank with a helical blade structure formed about the shaft so that approximately one-half the helical blade structure will be submerged in the water while the other half protrudes upwardly out of the water. This separates the tank into segments that confine the birds in separate groups moving along the tank, so that all of the birds are retained in the tank for an equal time. The helical blade structure includes helical segments, with the segments being offset axially of the auger shaft, so that the segments overlap one another longitudinally. This longitudinal offset of the helical segments with each other forms water passages through the helical blade structure at intervals along the auger. In the embodiment disclosed herein, these water passages extend axially along the auger shaft and face approximately tangentially of the auger shaft and intersect the perimeter of the auger segments. Typically, the water passages formed by the adjacent overlapping auger segments are formed at each 180° interval about the auger. The placement of water passages at intervals of 180° about the auger assures that at least one water passage for each 360° turn of the helical auger blade structure is submerged in the chilled water so as to continuously provide passage for the water through all segments of the tank. In some instances, it may be desirable to have more water passages per 360° turn of the helical blade structure of the auger. This is particularly so when the width of the chiller tank and the diameter of the auger are increased.

The water passages are arranged so that they tend to move with the auger away from the birds as the auger rotates, so that the birds naturally tend to avoid moving through the water passages during the operation of the chiller. Also, grills extend over the water passages so as to avoid any inadvertent movement of birds through the water passages. In a preferred embodiment, the grills at the water passages are formed of parallel, spaced bars that extend radially from the auger shaft out to the perimeter of the helical blade structure. This radial arrangement of the grill bars assures that the birds that might come in contact with a grill will always be able to fall from the grill as the grill is lifted above the level of the water, so that as the bars of the grill become vertically oriented there is no impediment to hold the birds on the grill.

In effect, the segmented helical blade structure amounts to cutting the blade flight at each half revolution of the auger blade, sliding the portion of the flight that is toward the bird-inlet end straight back on the shaft to provide the space that becomes the water passage. This causes the water passage to face circumferentially or tangentially of the auger shaft as opposed to axially of the auger. The water moving through the water passages tends to circulate in each segment of the tank between adjacent flights of the auger and thereby increases the tendency to move the birds in the body of water, to contact the warmer birds and to rapidly chill the birds.

This effective sliding of the cut flight backward on the auger shaft also assures that birds being pushed forward by the helical blade structure are momentarily relieved of contact with the auger blade and the pushing of the birds by the surfaces of the auger is intermittently terminated as each water passage moves past the birds. This tends to break up and reorient the birds from clumps or clusters of birds that may have formed in the water and it assures that the chilled water will have greater access to all surfaces of the birds for uniform chilling of the birds.

Since the water level in the tank normally can achieve a height of from level to the auger shaft to approximately 12 inches above the upper surface of the auger shaft, the helical blade structure having water passages at each 180° turn of the helical blade structure assures that one water passage and its grill on each flight is always fully submerged to allow the water full access to a complete water passage at all times.

Although the speed of operation of the auger is variable, the typical speed is one revolution per four minutes in a 10 foot diameter tank. The movement of the auger creates some tumbling action of the birds, particularly as the water passages with their stainless steel grills move through the bird mass. Also, since the water passages extend radially outward from the auger shaft as opposed to only at the perimeter of the auger, the force of the water is felt more uniformly through the center of the tank than only at the perimeter as was achieved by the prior art chillers. This tends to more uniformly and more rapidly cool the birds in the water. This is important since the birds must be chilled below the specified maximum temperature of 40° F. when leaving the chiller, because if the poultry inspector finds an occasional bird above the maximum leaving temperature, the inspector will stop the entire plant operation, including the eviscerating line, for a 15 minute interval to allow additional chilling time for the birds in the chiller, until the specified temperatures are achieved in every bird in the tank. Therefore, the uniform and more rapid chilling achieved by this invention in comparison to the prior art has the potential of reducing the length of the tank, of increasing the speed of rotation of the auger, or in either of the prior instances, of reducing the time of each bird in the chiller. This reduction in chilling time has an indirect benefit in that at the end of a shift in a poultry processing plant, there will be more time available to the workers to clean the chiller before the next work shift commences.

Therefore, it is an object of this invention to provide an improved chiller for poultry and other carcasses for more rapidly and more uniformly chilling the birds received from a processing line.

Another object of this invention is to provide a poultry chiller that has a short bird residence time in the chiller while still achieving the desired reduction in bird temperature.

Another object of this invention is to provide a poultry chiller which more thoroughly distributes the cold water through the tank and about the birds and which tends to reduce the tendency of the birds to become clustered together in masses of birds that would result in less effective chilling of the birds.

Another object of this invention is to provide an improved chiller that requires less floor space in a poultry processing plant.

Another object of this invention is to provide a poultry chiller which, by requiring a shorter residence time for the birds in the chiller, provides more cleanup time after the operation of the hiller has been terminated and before its operation is resumed.

Another object of this invention is to provide an improved poultry chiller that reduces the tendency of water starvation at the last segments of the chiller tank at shutdown of the operation of the tank.

Other objects, features and advantages of the present invention will become apparent upon reading the following specification, when taken in conjunction with the accompanying drawings.

DETAILED DESCRIPTION

Figure 1:
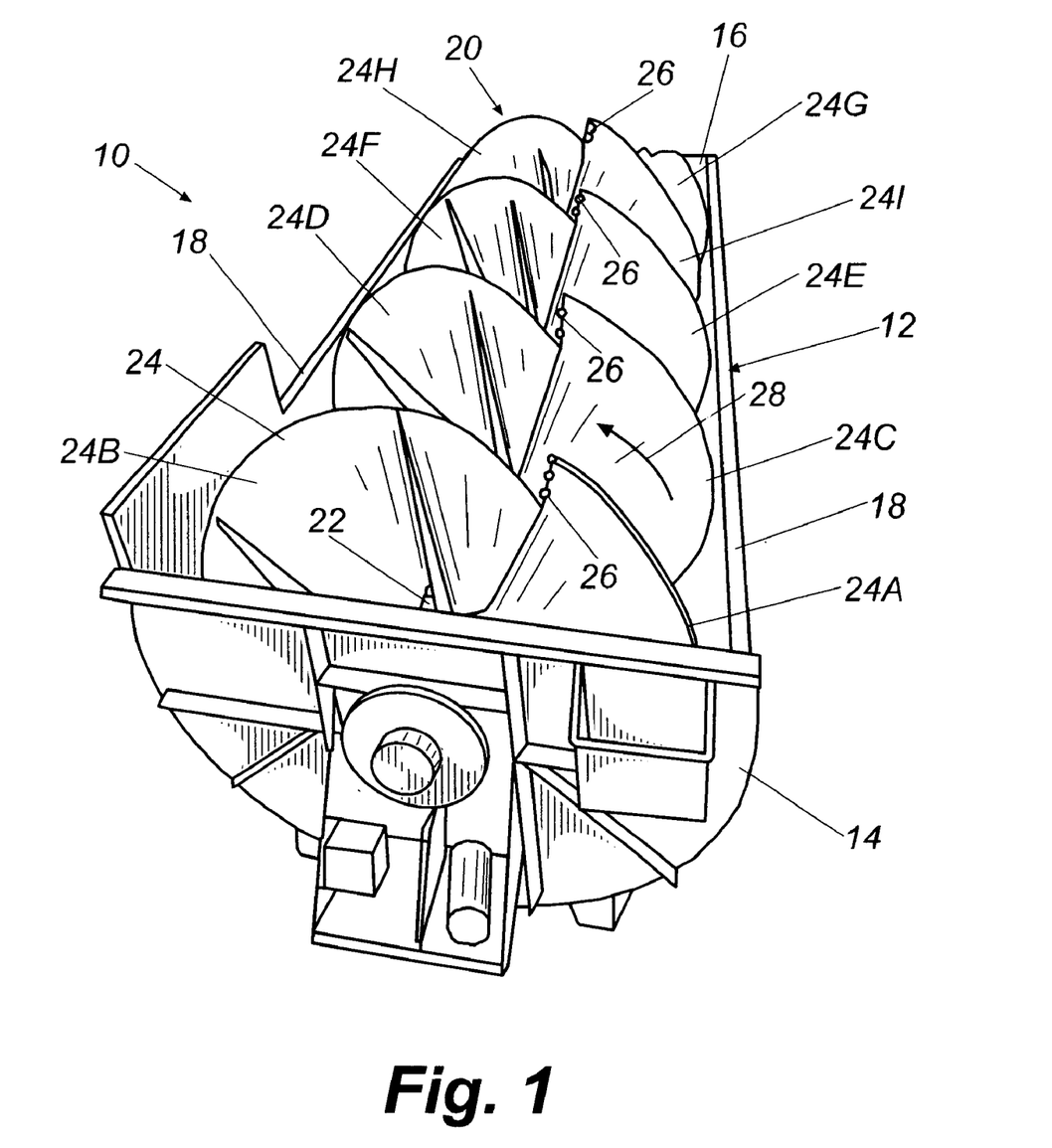
FIG. 1 is a perspective view of the poultry chiller.

Referring now in more detail to the drawings, in which like numerals indicate like parts throughout the several views, FIG. 1 illustrates the poultry chiller 10 that includes a trough-shaped water reservoir or tank 12 having a semi-cylindrical bottom wall 13, end walls 14 and 16, and a rim 18 formed at the upper edge of the bottom wall 12. The tank forms a reservoir for chilled water.

An auger 20 is positioned in the tank 12. Electric motor or other conventional power means 21 (FIG. 5) is arranged to rotate the auger. The auger includes an auger shaft 22 and a helical blade structure 23 formed around the shaft. The blade structure 23 is formed of a series of helical blade segments 24A–24G (FIG. 1), each of which is mounted to the auger shaft 22 and rotates in unison with the auger shaft. Each blade segment 24A–24G is offset axially with respect to the next adjacent blade segments along the length of the auger shaft 22 and the blade segments form gaps that function as water passages 26 for the passage of water along the tank.

Figure 2:
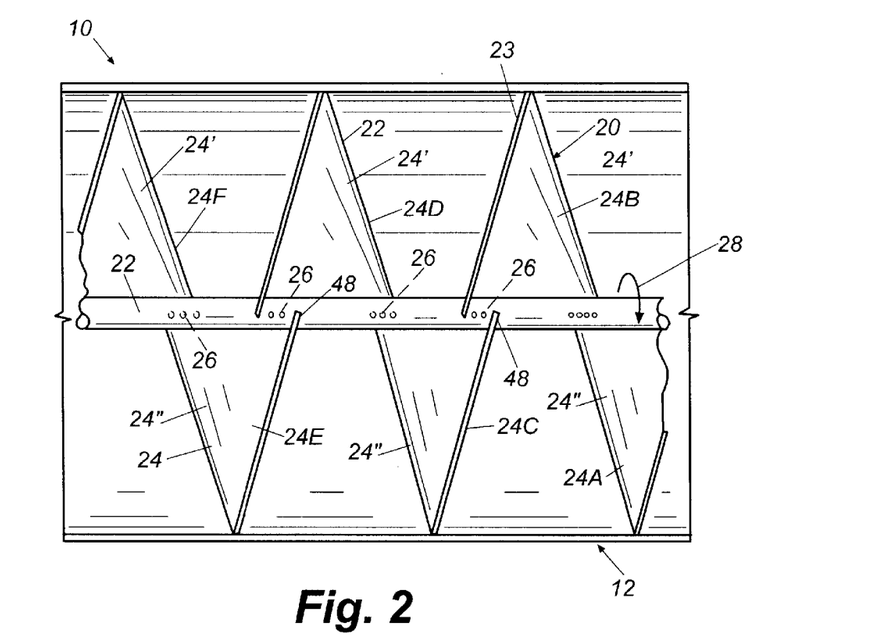
FIG. 2 is a partial plan view of a portion of the poultry chiller.
Figure 3:
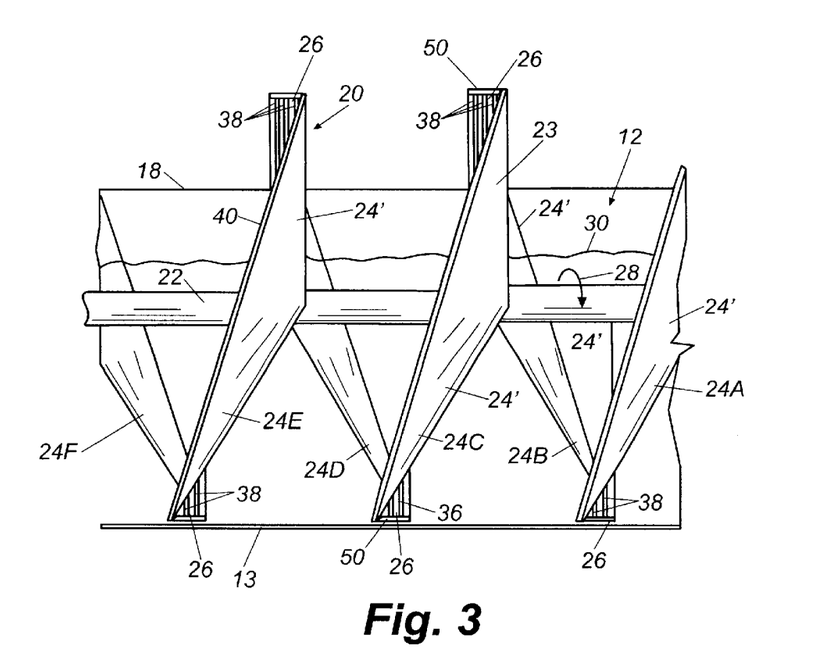
FIG. 3 is a side cross sectional view of a portion of the poultry chiller.

As shown in FIGS. 2 and 3, the auger blade segments 24A–24F are axially offset along the auger shaft 22 so that the gaps 26 extend axially of the auger shaft but face approximately tangentially or circumferentially with respect to the auger shaft. The gaps extend radially from the auger shaft entirely across the helical blade structure. The auger shaft 22 rotates in the direction indicated by arrow 28, so that the faces 24' (FIG. 3) of the helical blade segments 24 function as the bird engagement surfaces and the surfaces 24" function as the opposed following surfaces. The water passages permit the movement of water 30 adjacent the bird engagement surfaces 24' to a position adjacent the following surfaces 24". This is illustrated by the arrows 32 in FIGS. 4, 5 and 6.

In order to avoid having a bird 34 inadvertently move through a water passage 26, a grill 36 is positioned in each water passage 26. The grills 36 each include a plurality of elongated parallel bars 38 that extend radially from the auger shaft 22 to the perimeter 40 of the auger blade segments 24. The gaps between the adjacent auger blade segments 24 are approximately 9 inches, and the length of the gap extending radially from the auger shaft 22 is 42 inches for an 8 foot diameter tank, with the auger shaft having a diameter of 12 inches. The bars that form the grill 26 are ⅝ inch diameter stainless steel rods placed on 3 inch centers. An additional bar 50 extends parallel to the auger shaft 22 and is mounted to the distal ends of the bars 48, thereby bracing the bars as well as bracing the adjacent edges of the auger blade segments. If desired, additional brace bars 50 (not illustrated) can be placed at intervals along the length of the grill bars 48 for additional bracing of the bars 38, as may be necessary. The grills function as deflector means which fend the birds away from the water passages.

The perimeter 40 of each auger blade segment 24 is a continuous spiral from one water passage to the next, while the portions of the auger blade segments located inwardly of the perimeter are folded for purposes of strength enhancement, as well as to provide a rectangular shape for the gaps that form the water passages 26 between adjacent ones of the auger blade segments.

Figure 4:
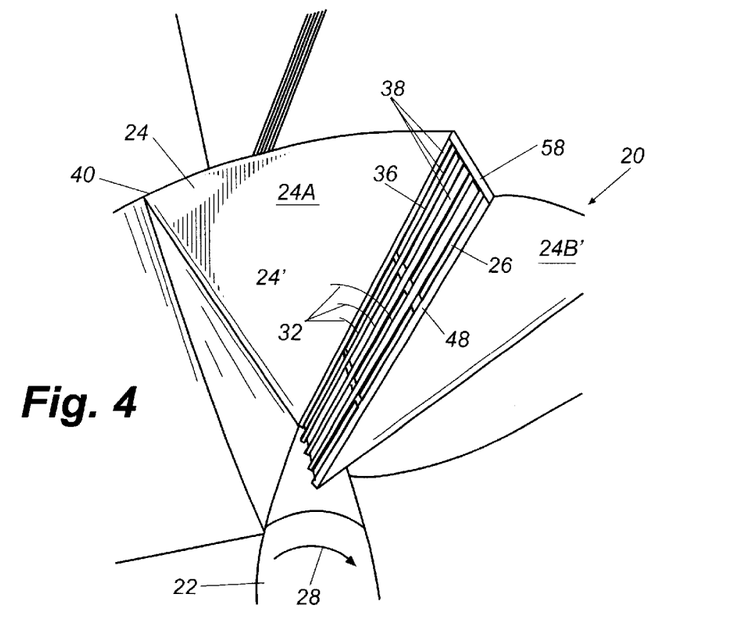
FIG. 4 is a perspective illustration of a water passage between adjacent helical segments of the auger blade structure, and a grill positioned in the water passage.
Figure 6:
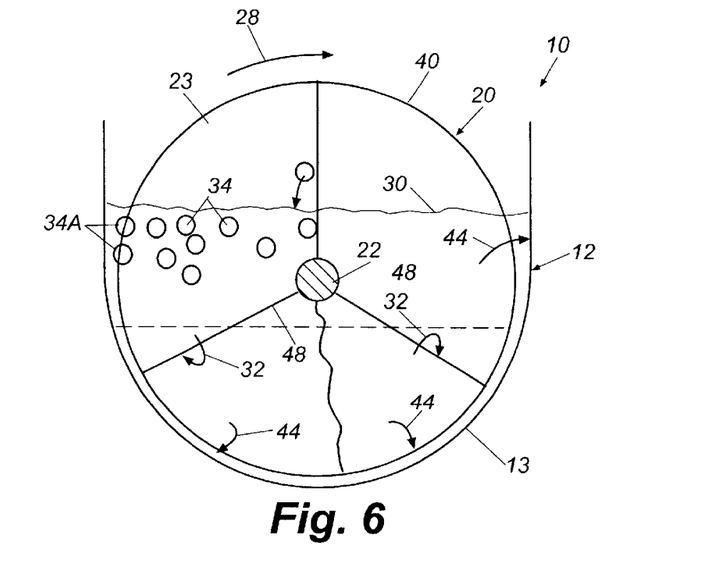
FIG. 6 is an end view of the auger and tank, taken along lines 6—6 of FIG. 5.

While FIGS. 2–4 illustrate gaps that form water passages 26 at 180° intervals about the helical blade structure 23, it will be noted from FIG. 6 that other structural arrangements can be provided by having the gaps formed at 120° intervals about the helical blade structure. This permits more passage of water along the tank through the helical blade structure of the auger, and is more desirable for the larger width chillers, such as the 12 foot wide chiller. Other intervals of water passages can be utilized, as may be desired, such as water passages at each 90° interval about the helical blade structure. However, it is highly desirable to have at least one water passage 26 submerged for each 360° rotation about the helical blade structure, so as to make sure that there is adequate passage of water at all times through the tank.

While the water passages 26 have been illustrated as being rectangular in shape, other shaped passages can be utilized, if desired. For example, wedge shaped passages could be used so that more space is available for water to flow adjacent the perimeter of the helical blade structure than adjacent the auger shaft.

Also, while the auger is illustrated as having helical blade segments 24A–24G, fewer or more blade segments can be used, depending on the length of the tank and other design features of the chiller.

Figure 5:
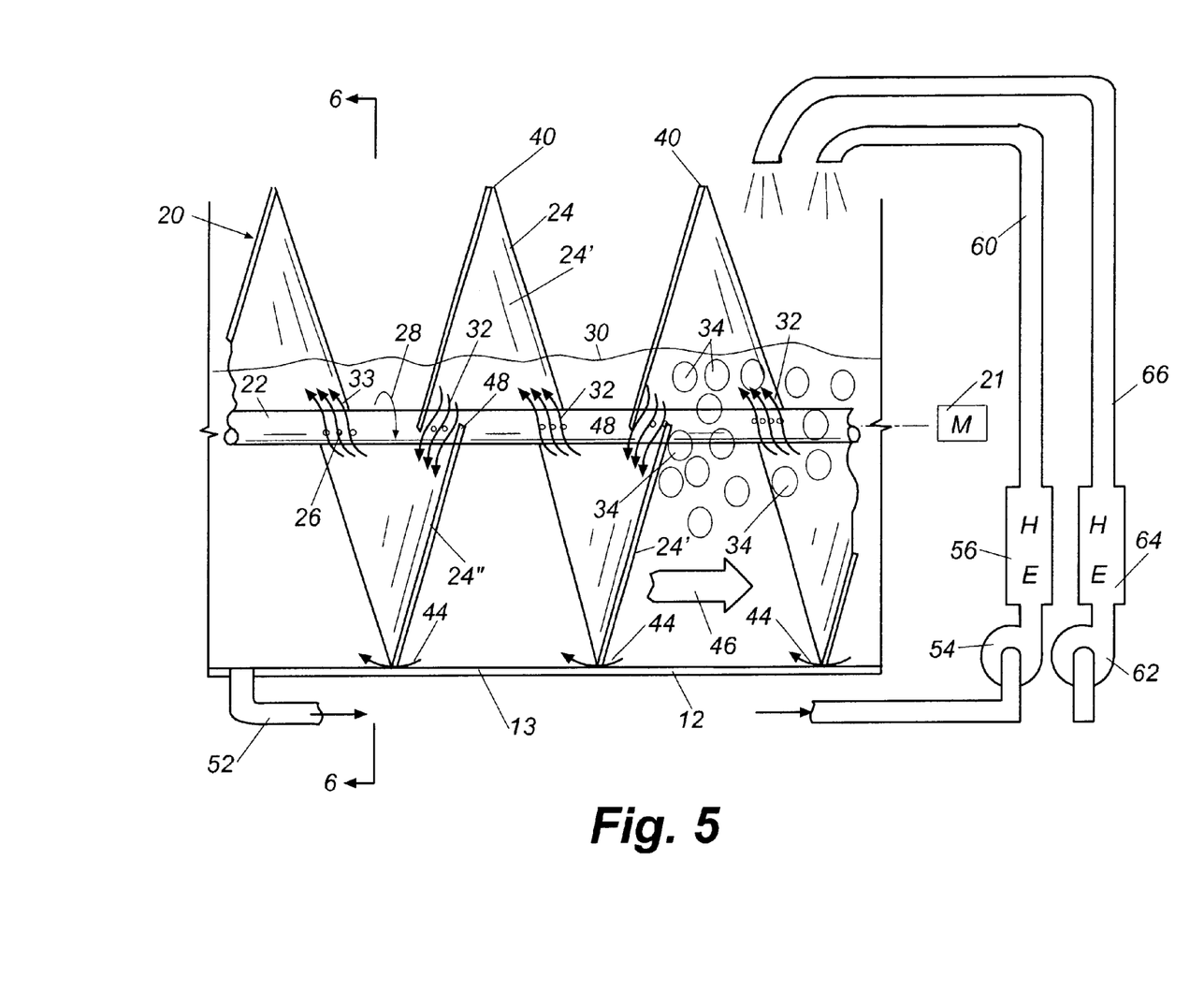
FIG. 5 is a schematic side elevational view of a portion of a chiller, showing the movement of the birds in a portion of the chiller.

In addition to the water being moveable through the water passages 26, water is also moveable around the perimeter 40 of the helical blade structure, as illustrated by arrows 44 (FIGS. 5 and 6).

As is commonplace for poultry chillers utilizing an auger for urging the birds, such as birds 34, along the length of the tank, the birds 34 tend to accumulate on one side of the tank due to the frictional contact made between the birds and the bird engagement surfaces 24' of the helical blade structure. Those birds 34A (FIG. 6) that become positioned adjacent the perimeter 40 of the helical blade structure 23 tend to block the passage of water from the bird engagement surface 24' to the following surface 24" of a blade. This tends to reduce the overall movement of water through the chiller; however, the water passages 26 between the staggered auger blade segments 24 tend to remain open and provide adequate space for the passage of large volumes of water through the chiller.

When the birds 34, which are driven by the auger 20 in the direction indicated by arrow 46, move off the edge 48 of one auger blade segment 24, the urging of the birds along the length of the tank by the auger is intermittently terminated as the birds wait to become engaged by the following auger blade segment. At this moment a water passage 26 passes the birds. This momentary relieving of the urging of the birds by the auger and the movement of the water from about the birds and through the water passage tend to assure that all surfaces of the birds are uniformly contacted and chilled by the cold water and tend to reorient the birds and to reposition the birds with respect to the other birds. All of this tends to expedite the transfer of heat from the birds.

Since the bars 38 of the grills 36 are oriented radially with respect to the helical blade structure 23, if any bird should become trapped in the bars of a grill, the grill will eventually move above the water line 30, so that the weight of the bird will tend to move the bird under the influence of gravity down the face of the grill and back into the water. Since the grill is made primarily of radially extending bars, there is substantially no impediment to the weight of the bird moving the bird back into the water and freeing the bird of the grill.

Figure 7:
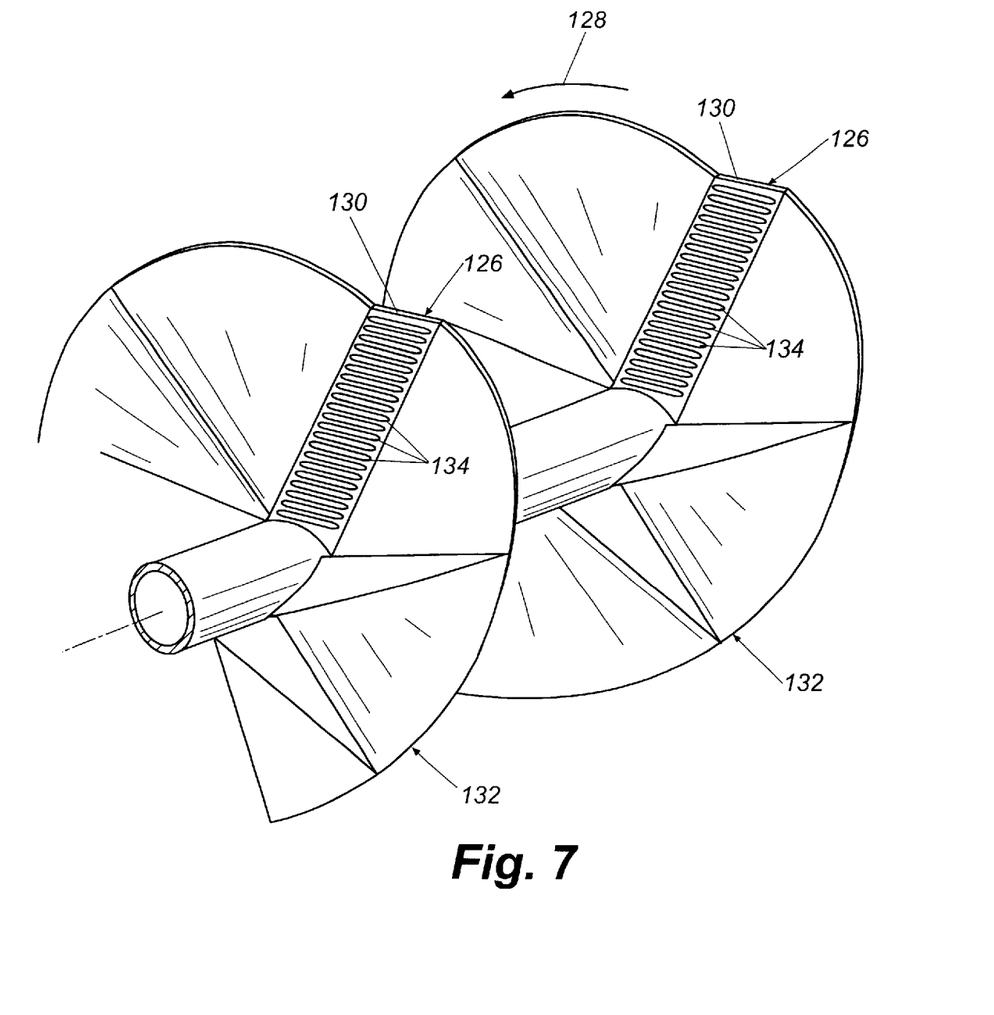
FIG. 7 is a perspective illustration of another embodiment of the invention, showing an alternate water passage structure.

FIG. 7 shows another embodiment of the invention in which the water passages 126 are formed in angled segments 130 of a continuous helical blade structure 132. The water passages are formed as a series of holes 130 in the angled segment. The holes 134 are in the form of elongated rectilinear slots that extend approximately at a right angle with respect to a radius from the axis of rotation 136 of the auger. The auger rotates in the direction as indicated by arrow 128.

In both embodiments of the invention, and as schematically illustrated in FIG. 5, the water 30 is recirculated from a first end to a second end of the tank 12. A drain 52 is positioned at the second end of the tank, and the water is moved from the drain 50 through a pump 54, from the pump through a heat exchanger 56 generally of the type disclosed in U.S. Pat. No. 5,509,470, and through a conduit 60, where it is directed to the first end of the tank 12. Makeup water from a source of fresh water is likewise moved through a pump 62, heat exchanger 64, conduit 66, where it is similarly added to the body of water in the tank 12. The heat exchangers reduce the temperature of the water to approximately 34° F., or at such other desired temperatures. With this arrangement, fresh water is continuously added to the tank, and a corresponding amount of water is drained away from the tank, thereby assuring the quality of water in the tank.

While the water level 30 is shown above the auger shaft 22 so as to conveniently illustrate the flow of water through the water passages, the normal level of water will be maintained at the level of the auger shaft 22.

The speed of rotation of the auger can be adjusted as may be desired, but typically runs at one revolution for each four minutes. As it revolves, the auger creates some tumbling action of the birds as the water passages move by the birds. Also, since there is a counter-flow of the chilled water that passes through the water passages formed in the helical blade structure, the water is channeled in a rotating manner through the birds, moving the water flow uniformly through the entire mass of birds, and creating more rapid and uniform chilling action of the birds.

It will be noted from FIGS. 1–3, 5 and 7 that the water passages are aligned at each 180° interval about the helical blade structure. However, it is not critical that the water passages be aligned as illustrated.

When the invention is embodied in, for example, an 8 foot wide tank, the tank has a capacity of 450 lb. per linear foot of birds. For a 10 foot wide tank, the capacity is 650 lb. per linear foot of birds.

The water being delivered to the tank, both recirculated water and fresh water, for a 10 foot tank is 950 GPM through a 50 hp pump. For an 8 foot wide tank, 440 gallons are delivered per minute with a 25 hp pump. This can be increased with the use of the 50 hp pump that typically is associated with a 10 foot diameter tank.

Although preferred embodiments of the invention has been disclosed in detail herein, it will be obvious to those skilled in the art that variations and modifications of the disclosed embodiments can be made without departing from the spirit and scope of the invention as set forth in the following claims.

What is claimed is:

1. A chiller for reducing the temperature of previously eviscerated oven-ready whole birds and the like, comprising:
    a tank having first and second opposed ends and defining a water reservoir between said ends;
    water fill means for introducing water in said reservoir at a first end of said tank and draining water at a second end of said tank and forming a movement of water generally from said first end toward said second end of said tank;
    an auger in said tank extending between said first end and said second end of said tank, said auger including an auger shaft and a helical blade structure mounted to and extending about said auger shaft, said helical blade structure defining therein water passages for passing water from one side to the other side of said blade structure said water passages extending radially from said auger shaft and facing approximately tangentially of said auger shaft and movable with said auger in a rotary direction away from the birds in said tank;
    power means in driving relationship with said auger and arranged to rotate said auger about an axis of rotation in a rotary direction to urge birds from said second end toward said first end of said tank and to move said water passages of said auger in a rotary direction away from the birds in said tank so that the birds do tend to not pass through said water passages of said auger;
    whereby the birds are urged in one direction by the auger from the second end of the tank toward the first end of the tank as the water flows in the tank through the water passages of the auger blade in a counter flow direction.

2. The chiller of claim 1, wherein:
said helical blade structure is formed in helical segments offset longitudinally along said auger shaft and adjacent ones of said helical segments defining said radially extending water passages therebetween, said radially extending water passages being axially extending.

3. The chiller of claim 2, wherein:
said axially extending water passages are formed in said helical blade structure at intervals of not more than 180 degrees about said helical blade structure, whereby at least one water passage is submerged in the water of said tank for every 360 degrees of helical blade structure.

4. The chiller of claim 1, and further including:
deflector means spanning said water passages in said helical blade structure for retarding the movement of birds through said water passages in said helical blades structure.

5. The chiller of claim 4, wherein:
said deflector means comprises a grill with spaced parallel bars imposed across said water passage openings.

6. The chiller of claim 4, wherein:
said deflector means comprises an angled segment of said helical blade structure and a plurality of holes formed in said angled segment.

7. The chiller of claim 1, wherein:
said helical blade structure includes helical segments axially overlapping one another along the length of said auger shaft.

8. The chiller of claim 1, wherein:
said tank is an elongated semi-cylindrical open top tank defining a trough-shaped reservoir with an upper rim, and said auger shaft is mounted in said tank at a level below said upper rim and said helical segments protrude above and below said upper rim.

9. The chiller of claim 1, wherein:
said water fill means includes a water circulation system for moving water drained from said second end of said tank to the first end of said tank.

10. The chiller of claim 9, wherein:
said water fill means includes a refrigeration system for cooling the water as the water is circulated.

11. The chiller of claim 1, wherein:
said water fill means includes a water make up system for adding fresh water to said tank at said first end of said tank.

12. The chiller of claim 11, wherein:
said water make up system includes a refrigeration system for cooling the fresh water as the fresh water is added to said tank.

13. A chiller for reducing the temperature of previously eviscerated oven-ready whole birds and the like, comprising:

a tank having a first and second opposed ends and defining a water reservoir between said ends;

a water circulation system for introducing water into said tank at said first end of said tank and draining water at a second end of said tank and forming a movement of water generally from said first end toward said second end of said tank;

an auger in said tank extending between said first end and said second end of said tank, said auger including an auger shaft and a helical blade structure mounted to and extending about said auger shaft, said helical blade structure formed in segments extending along said shaft with adjacent segments overlapping one another and forming water passages facing approximately tangentially of said auger shaft for passing water between said segments of said helical blade structure; and power means in driving relationship with said auger and arranged to rotate said auger about said auger shaft to urge birds in the water from said second end toward said first end of said tank and to move said water passages of said auger in a rotary direction away from the birds in said tank, so that the birds tend to not pass through said water passages of said auger.

* * * * *